(12) United States Patent
Yamato et al.

(10) Patent No.: US 11,170,348 B2
(45) Date of Patent: *Nov. 9, 2021

(54) POINT CALCULATION DEVICE, BOAT, POINT CALCULATION METHOD, AND PROGRAM

(71) Applicant: MITSUBISHI SHIPBUILDING CO., LTD., Yokohama-shi (JP)

(72) Inventors: Kuniaki Yamato, Tokyo (JP); Ryoichi Takei, Tokyo (JP); Shinichi Taniguchi, Tokyo (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 326 days.

This patent is subject to a terminal disclaimer.

(21) Appl. No.: 15/518,764

(22) PCT Filed: Aug. 3, 2015

(86) PCT No.: PCT/JP2015/071904
§ 371 (c)(1),
(2) Date: Apr. 13, 2017

(87) PCT Pub. No.: WO2016/059851
PCT Pub. Date: Apr. 21, 2016

(65) Prior Publication Data
US 2017/0249598 A1    Aug. 31, 2017

(30) Foreign Application Priority Data
Oct. 15, 2014 (JP) .............................. JP2014-210581

(51) Int. Cl.
*G06Q 30/06* (2012.01)
*G06Q 10/10* (2012.01)
(Continued)

(52) U.S. Cl.
CPC ......... *G06Q 10/1095* (2013.01); *G06Q 30/02* (2013.01); *G06Q 30/0226* (2013.01); *G06Q 50/30* (2013.01)

(58) Field of Classification Search
CPC ....................................................... G06Q 30/00
See application file for complete search history.

(56) References Cited

U.S. PATENT DOCUMENTS 6,687,714 B1    2/2004 Kogen et al.
7,992,440 B2 *  8/2011 Kumagai ............... G01H 9/004
                                                          73/643
(Continued)

FOREIGN PATENT DOCUMENTS

EP          1443442 A2     8/2004
JP       H10-269250 A    10/1998
(Continued)

OTHER PUBLICATIONS

Korea Patent Office, "Office Action for Korean Patent Application No. 10-2017-7009979," dated Jan. 9, 2018.
(Continued)

*Primary Examiner* — Eric R Netzloff
(74) *Attorney, Agent, or Firm* — Kanesaka Berner and Partners LLP

(57) ABSTRACT

A point calculation device includes a point granting information acquisition unit configured to acquire a point granting start time and a point granting end time for use points relating to a vehicle; and a point calculation unit configured to calculate use points for a user of the vehicle according to a time difference between the acquired point granting start time and the acquired point granting end time.

18 Claims, 6 Drawing Sheets

(51) Int. Cl.
*G06Q 30/02* (2012.01)
*G06Q 50/30* (2012.01)

(56) References Cited

U.S. PATENT DOCUMENTS

| | | | |
|---|---|---|---|
| 8,482,405 | B1 | 7/2013 | Pierce et al. |
| 8,746,033 | B2* | 6/2014 | Asano ................ G01C 19/5776 73/1.37 |
| 8,935,038 | B2* | 1/2015 | Chinnadurai ............ G01H 1/00 701/31.4 |
| 2002/0145051 | A1* | 10/2002 | Charrin ................ G06K 7/0004 235/492 |
| 2005/0236477 | A1 | 10/2005 | Chase |
| 2005/0278215 | A1* | 12/2005 | Seele, Jr. ............... G06Q 30/02 705/14.19 |
| 2006/0059038 | A1 | 3/2006 | Iuchi et al. |
| 2008/0201472 | A1* | 8/2008 | Bistriceanu ........ G06Q 30/0277 709/225 |
| 2008/0255714 | A1* | 10/2008 | Ross ....................... G01S 7/003 701/14 |
| 2009/0055271 | A1* | 2/2009 | Drefs ..................... G06Q 30/02 705/14.27 |
| 2009/0106101 | A1* | 4/2009 | Green .................... G06Q 10/08 705/14.23 |
| 2009/0259549 | A1* | 10/2009 | Winand ................. G06Q 10/08 705/14.35 |
| 2010/0197325 | A1* | 8/2010 | Dredge ................... H04W 4/02 455/456.3 |
| 2010/0198492 | A1* | 8/2010 | Watanabe ............. G01M 1/122 701/124 |
| 2011/0290875 | A1* | 12/2011 | Wengrovitz ........... G06Q 30/02 235/384 |
| 2012/0109373 | A1* | 5/2012 | Shiomi .............. G06K 13/0843 700/242 |
| 2013/0218427 | A1* | 8/2013 | Mukhopadhyay .... B60W 40/09 701/51 |
| 2014/0340241 | A1* | 11/2014 | Smart, Jr. ................ G08G 3/00 340/932.2 |
| 2015/0041663 | A1* | 2/2015 | Oliver ................... G01J 1/0219 250/372 |
| 2015/0142497 | A1* | 5/2015 | Osumi ................... G08G 1/202 705/7.23 |
| 2015/0161418 | A1* | 6/2015 | Ishikawa ................ G06K 13/06 235/449 |
| 2015/0296334 | A1* | 10/2015 | Smyrk .................... H04W 8/02 455/456.3 |

FOREIGN PATENT DOCUMENTS

| | | |
|---|---|---|
| JP | 2002-133017 A | 5/2002 |
| JP | 2002-304563 A | 10/2002 |
| JP | 2002304563 A | 10/2002 |
| JP | 2004-265087 A | 9/2004 |
| JP | 2004265087 A | 9/2004 |
| JP | 2004-295521 A | 10/2004 |
| JP | 2004-302688 A | 10/2004 |
| JP | 2012-022420 A | 2/2012 |
| JP | 2013-114347 A | 6/2013 |
| KR | 10-2011-0101535 A | 9/2011 |
| KR | 2014-0098732 A | 8/2014 |

OTHER PUBLICATIONS

"The Collaboration Airline Flight, and Load Can Send," Jul. 21, 2011, <source: http://www.hansfamily.kr/1126>.

PCT/ISA/210, "International Search Report for International Application No. PCT/JP2015/071904," dated Sep. 8, 2015.

PCT/IPEA/409, "International Preliminary Report on Patentability for International Application No. PCT/JP2015/071904," dated Aug. 23, 2016.

"Mairusu O Shirabeyou! [online]," Japan Airlines, Sep. 27, 2014, [retrieval date: Mar. 18, 2016], Internet:<URL:http://www.jal.co.jp/cgi-bin/jal/milesearch/use/flt_mile-use.cgi>.

International Search Report and Written Opinion of International Application No. PCT/JP2015/071814 dated Sep. 15, 2015; 9pp.

\* cited by examiner

| POINT ID | EMBARKATION PORT | EMBARKATION TIME | DISEMBARKATION PORT | DISEMBARKATION TIME | PASSENGER ROOM GRADE | OPERATION ID |
|---|---|---|---|---|---|---|
| 123456 | PORT A | YYYY/MM/DD hh:mm:ss1 | PORT C | YYYY/MM/DD hh:mm:ss2 | FIRST GRADE | 001 |
| ... | ... | ... | ... | ... | ... | ... |

FIG. 4

| OPERATION ID | BRANCH NUMBER | VESSEL TYPE | DEPARTURE PORT | SCHEDULED PORT DEPARTURE TIME | PORT DEPARTURE TIME | ARRIVAL PORT | SCHEDULED PORT ARRIVAL TIME | PORT ARRIVAL TIME |
|---|---|---|---|---|---|---|---|---|
| 001 | 01 | NO. XXX | PORT A | YYYY/MM/DD hh:mm:ss3 | YYYY/MM/DD hh:mm:ss4 | PORT B | YYYY/MM/DD hh:mm:ss5 | YYYY/MM/DD hh:mm:ss6 |
| 001 | 02 | NO. XXX | PORT B | YYYY/MM/DD hh:mm:ss7 | YYYY/MM/DD hh:mm:ss8 | PORT C | YYYY/MM/DD hh:mm:ss9 | YYYY/MM/DD hh:mm:ss10 |
| 001 | 03 | NO. XXX | PORT C | YYYY/MM/DD hh:mm:ss11 | YYYY/MM/DD hh:mm:ss12 | PORT D | YYYY/MM/DD hh:mm:ss13 | YYYY/MM/DD hh:mm:ss14 |

| CONDITION | GRANTED POINTS |
|---|---|
| PORT A TO PORT B (PREDICTED EMBARKATION TIME PERIOD: x HOURS) | 100 POINTS |
| PORT B TO PORT C (PREDICTED EMBARKATION TIME PERIOD: y HOURS) | 120 POINTS |
| PORT B TO PORT C (PREDICTED EMBARKATION TIME PERIOD: z HOURS) | 80 POINTS |
| PORT A TO PORT B (MORNING TO DAYTIME) | 100 POINTS |
| PORT A TO PORT B (NIGHTTIME) | 110 POINTS |
| EMBARKATION TIME PERIOD | 1 POINT PER MINUTE |
| DEPARTURE DELAY | 5 POINT PER MINUTE |
| ARRIVAL DELAY | 10 POINT PER MINUTE |
| NAVIGATION TIME PERIOD | 1 POINT PER MINUTE |
| EMBARKATION FOR X HOURS OR MORE | 10 POINTS |
| FIRST GRADE ROOM | 10 POINTS |
| FOUR OR MORE PERSONS | 5 POINTS |
| NAVIGATION CANCELLATION | 10 POINTS |
| EMBARKATION RATIO OF 90% OR MORE | 5 POINTS |
| NUMBER OF EMBARKATIONS | 1 POINT PER EMBARKATION |
| CARD GRADE (1ST) | 5 POINTS |
| CARD GRADE (2ND) | 10 POINTS |
| CARD GRADE (3RD) | 20 POINTS |
| PORT SKIP | 10 POINTS |
| RETURN | 10 POINTS |

| POINT ID | NAME | CONTACT INFORMATION | ACCUMULATED NUMBER OF POINTS | VALIDITY PERIOD | CARD GRADE |
|---|---|---|---|---|---|
| 123456 | XX XX | TOKYO~ | 1000 | YYYY/MM/DD | 1st |
| ... | ... | ... | ... | ... | ... |

104

POINT CALCULATION DEVICE, BOAT, POINT CALCULATION METHOD, AND PROGRAM

RELATED APPLICATIONS

The present application is a National Phase of International Application Number PCT/JP2015/071904, filed Aug. 3, 2015, and claims priority based on Japanese Patent Application No. 2014-210581, filed Oct. 15, 2014.

TECHNICAL FIELD

The present invention relates to a point calculation device, a boat, a point calculation method, and a program.

Priority is claimed on Japanese Patent Application No. 2014-210581, filed Oct. 15, 2014, the content of which is incorporated herein by reference.

BACKGROUND ART

Airline companies are converting flight distances of passengers using airplanes into points, storing the points, and providing services for providing the passengers with benefits such as free air tickets in accordance with the accumulated points. In terms of route buses, attempts have also been made to promote the use of route buses by granting points according to, for example, a purchase price, the number of times of use, and the like of a commuter pass or a coupon ticket. When such a service is provided, a boarding/deboarding record for each passenger is necessary. For example, Patent Document 1 discloses a route bus boarding/deboarding data collection system that records a numbered ticket number, a boarding time, and a boarding bus stop when a numbered boarding ticket of a route bus is issued and records a deboarding time and a deboarding bus stop in correspondence with the numbered ticket number recorded at a time of boarding when the numbered boarding ticket is collected from a deboarding passenger.

In the ferry industry, for example, a service of putting a stamp on a stamp card for each embarkation and discounting an embarkation fare when a predetermined number of stamps are accumulated is carried out.

CITATION LIST

Patent Literature

[Patent Document 1]
Japanese Unexamined Patent Application, First Publication No. H10-269250

SUMMARY OF INVENTION

Technical Problem

Incidentally, for example, the case of a ferry, there may be a difference an embarkation time according to weather or the like even on the same route. For example, when a sea is rough, navigation is time-consuming, and an arrival of the ferry is delayed, a passenger might be dissatisfied if the same points as in a normal time are granted just because the passenger embarked on the ferry in the same section. However, in the conventional point granting method, because the time of actually embarking on a boat is not taken into consideration, the dissatisfaction of this passenger could not be solved. The same is also true for other vehicle. Also, the method described in Patent Document 1 does not solve this problem.

The present invention provides a point calculation device, a boat, a point calculation method, and a program capable of solving the above-described problems.

Solution to Problem

According to a first aspect of the present invention, a point calculation device includes a point granting information acquisition unit configured to acquire a point granting start time and a point granting end time for use points relating to a vehicle; and a point calculation unit configured to calculate first use points for a user of the vehicle according to a time difference between the acquired point granting start time and the acquired point granting end time.

According to a second aspect of the present invention, the point granting start time is a boarding time of the user on the vehicle, and the point granting end time is a deboarding time of the user from the vehicle.

According to a third aspect of the present invention, the point granting start time is a departure time of the vehicle, and the point granting end time is an arrival time of the vehicle.

According to a fourth aspect of the present invention, the point granting start time is a scheduled departure time of the vehicle, and the point granting end time is a scheduled arrival time of the vehicle.

According to a fifth aspect of the present invention, the point calculation unit adds second use points calculated according to a difference between a boarding time of the user on the vehicle and a departure time of the vehicle to the first use points.

According to a sixth aspect of the present invention, the point calculation unit adds second use points calculated according to a difference between a deboarding time of the user from the vehicle and an arrival time of the vehicle to the first use points.

According to a seventh aspect of the present invention, the point calculation unit adds second use points calculated according to a difference between a scheduled arrival time of the vehicle and an arrival time of the vehicle to the first use points.

According to an eighth aspect of the present invention, the point calculation unit adds second use points calculated according to a difference between a scheduled departure time of the vehicle and a departure time of the vehicle to the first use points.

According to a ninth aspect of the present invention, the point calculation unit adds the calculated second use points to use points determined for a predetermined boarding section instead of the first use points calculated according to the time difference between the point granting start time and the point granting end time.

According to a tenth aspect of the present invention, the point calculation unit calculates use points according to a sum of the time difference between the point granting start time and the point granting end time when the vehicle is used for a predetermined period.

According to an eleventh seventh aspect of the present invention, the point calculation unit adds second use points calculated according to at least one of a grade of a card in which identification information of the user is recorded to be used by the user to record boarding on the vehicle, the grade of a passenger room used by the user in the vehicle, the number of times that the user boards the vehicle, the number of users pre-registered as users on board with the user when he/she boards the vehicle, a level of crowdedness of the vehicle in a section in which the user boards the vehicle, and a case in which the user has not deboarded the vehicle at a scheduled deboarding place to the first use points.

According to a twelfth aspect of the present invention, the point calculation unit calculates points for a case in which the vehicle is not operated when the vehicle is not operated.

According to a thirteenth aspect of the present invention, the point calculation device further includes a shaking determination unit configured to acquire detection information of a vibration sensor mounted on the vehicle or weather information and determine a shaking of the vehicle according to the acquired information, wherein the point calculation unit further adds use points calculated according to a time period during which the shaking determination unit determines that the vehicle is in a shaken state.

According to a fourteenth aspect of the present invention, the point calculation device further includes an output unit configured to output the first use points calculated by the point calculation unit, wherein, when the point calculation unit has calculated the second use points, the output unit outputs the second use points in addition to the first use points by distinguishing the second use points from the first use points.

According to a fifteenth aspect of the present invention, a boat includes the point calculation device according to any one aspect described above.

According to a sixteenth aspect of the present invention, a point calculation method includes: acquiring, by a point calculation device, a point granting start time and a point granting end time for use points relating to a vehicle; and calculating, by the point calculation device, first use points for a user of the vehicle according to a time difference between the acquired point granting start time and the acquired point granting end time.

According to a seventeenth aspect of the present invention, a program causes a computer of a point calculation device to function as: a acquirer configured to acquire a point granting start time and a point granting end time for use points relating to a vehicle; and a calculator configured to calculate first use points for a user of the vehicle according to a time difference between the acquired point granting start time and the acquired point granting end time.

Advantageous Effects of Invention

According to the above-described point calculation device, boat, point calculation method, and program, it is possible to grant points according to a time period during which a user is actually embarked on a boat. Also, it is possible to provide information such as advantageous information for each user based on embarkation records, contact information, and the like for each user.

BRIEF DESCRIPTION OF DRAWINGS

FIG. 4 is a second diagram showing an example of a table used in point calculation in the first embodiment according to the present invention.

FIG. 5 is a third diagram showing an example of a table used in point calculation in the first embodiment according to the present invention.

DESCRIPTION OF EMBODIMENTS

First Embodiment

Hereinafter, a point calculation device according to the first embodiment of the present invention will be described with reference to FIGS. 1 to 7.

Figure 1:
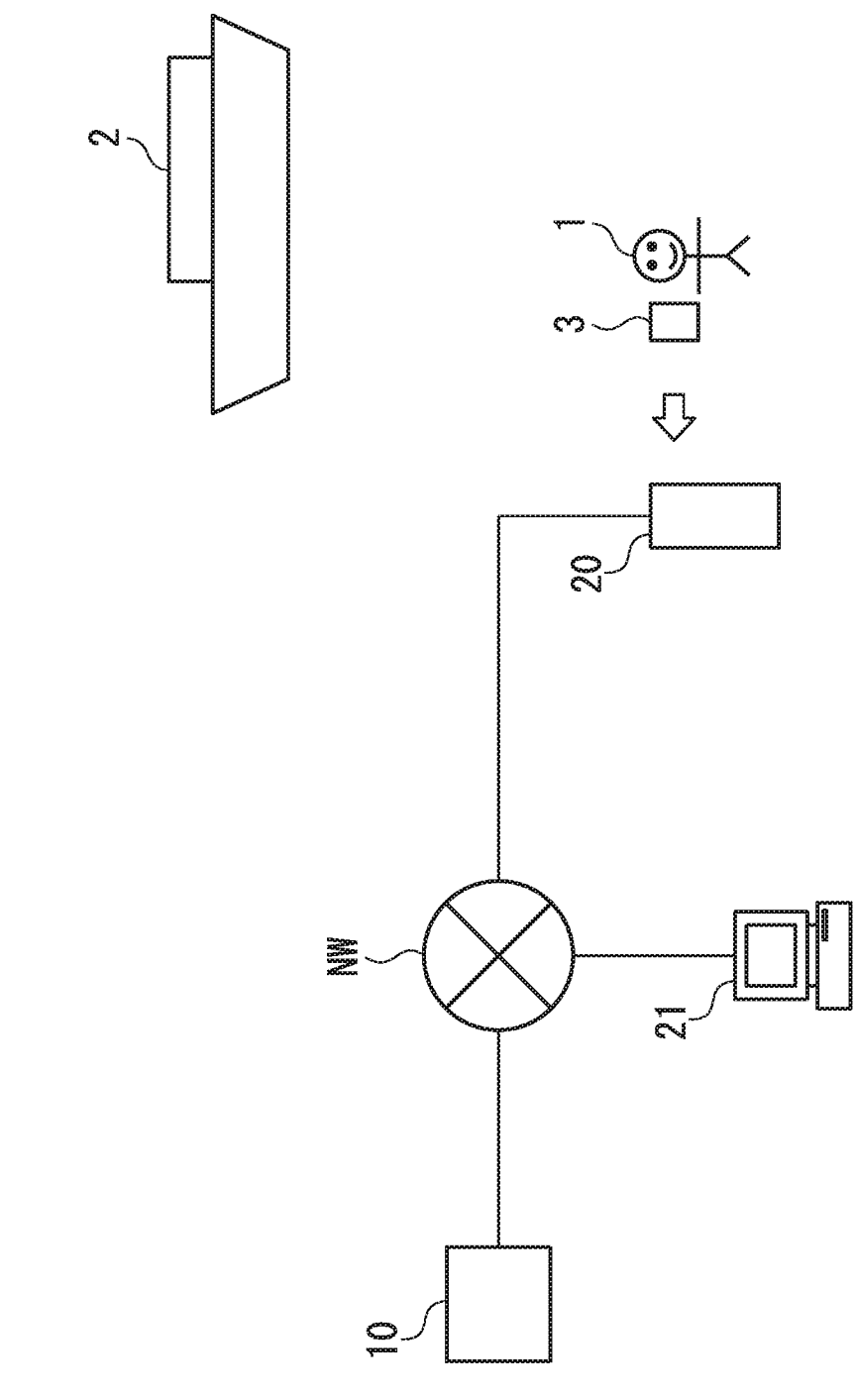
FIG. 1 is a diagram showing an example of a point calculation system in a first embodiment according to the present invention.

FIG. 1 is a diagram showing an example of a point calculation system according to the first embodiment of the present invention.

The point calculation system of the present embodiment is a system that calculates points according to an embarkation time period of a user for the user (passenger) who uses a passenger boat and grants the calculated points to the user. When points are accumulated, the user obtains a right in which the user can embark on a boat for free, embark on a boat at a discounted price, use a high-grade passenger room, exchange points with other point systems at a fixed conversion rate, or use benefits of other systems.

A user 1 is a passenger using a boat 2. The boat 2 is, for example, a ferry.

The user 1 possesses a card 3 for receiving a use point service of the boat 2. The card 3 is, for example, an IC card or a magnetic card. On an IC chip or a magnetic tape of the card 3, identification information (a point ID) of the card 3 or reservation information of a service to be used is recorded. The reservation information includes information such as an embarkation port, a disembarkation port, and a grade of a passenger room to be used. The point ID is associated with the user 1 and recorded on a storage unit provided in a point calculation device 10 that will be described below.

A transmission device 20 transmits information such as a point ID. The transmission device 20 is configured to include a reader and a computer. The reader reads the point ID from the card 3, and the computer acquires the point ID read by the reader, adds information such as a reading time or a port for which the point ID is read to the point ID, and transmits the information to the point calculation device 10. The information added to the point ID can be changed by an employee operating the computer. The transmission device 20 is installed, for example, at a port side entrance through which the user 1 passes when embarking on/disembarking from the boat 2 or near an entrance of the boat 2.

At a time of embarking on and disembarking from the boat 2, the user 1 causes the transmission device 20 to read the information recorded on the card 3 by holding the card 3 over the transmission device 20. The transmission device 20 transmits the point ID read from the card 3 and a reading time to the point calculation device 10 via a network. Here, particularly at the time of disembarkation, a fixed value such as a scheduled arrival time may be used instead of the reading time.

A terminal device 21 is a device including a computer. Each port or another management place (a data center or the like) is equipped with the terminal device 21, and an employee of the port inputs departure and arrival times of the boat 2 to the terminal device 21. The terminal device 21 transmits the input departure and arrival times to the point calculation device 10 via the network.

Also, the card 3 does not necessarily have to be possessed by the user 1. For example, the boat 2 is provided with a passenger room and the user 1 normally receives a passenger room key and embarks on the boat. Therefore, when the user 1 embarks on or disembarks from the boat using a card key in which the passenger room key and the card 3 are integrated, the transmission device 20 may read information such as the point ID recorded on the card key. In this case, a writing device is connected to the terminal device 21 so that the card key may be given to the user 1 after the point ID or boat reservation information is written to the card key when the employee gives the card key to the user 1. The point ID or the reservation information of the user 1 is pre-stored in the storage unit of the point calculation device 10 in association with information such as a name or an address of the user 1 and the terminal device 21 acquires the point ID of the user 1 from the storage unit of the point calculation device 10 according to the information such as the name of the user 1 and records the acquired point ID in the card key.

Also, the point ID may be recorded on a portable terminal device such as a smartphone possessed by the user 1 instead of the card 3 and the point ID may be read by the transmission device 20 when the user 1 holds the portable terminal device over it.

Also, the card 3 or the transmission device 20 is not necessarily indispensable the point calculation system. For example, a crew member of the boat 2 handwrites an embarkation time and a disembarkation time on a paper embarkation ticket to be issued to each user 1 and an employee who is in a port where the user has disembarked from the boat inputs the embarkation time and the disembarkation time to the terminal device 21.

The terminal device 21 may acquire the point ID from the storage unit of the point calculation device 10 according to an instruction operation of the employee and transmit information such as the point ID, the embarkation time, and the disembarkation time to the point calculation device 10. In the following description, a case in which the user 1 possesses the card 3 will be described as an example.

The point calculation device 10 grants points calculated using an embarkation/disembarkation time of the user 1 or an arrival/departure port time of the boat 2 acquired from the transmission device 20 or the terminal device 21 to the user 1. Granting points to the user 1 indicates recording calculated points in association with the point ID of the user 1. Also, the embarkation/disembarkation time of the user 1 and the departure/arrival port time of the boat 2 used for calculating the points are collectively referred to as a point granting time. The point granting time includes a point granting start time and a point granting end time. A time period that elapses from the point granting start time to the point granting end time is referred to as a point granting time period. The point calculation device 10 may be installed in a data center or the like or may be mounted on the boat 2.

Also, a point granting history calculated by the point calculation device 10, the currently accumulated number of points, or the like can be browsed through a web page or the like dedicated to the user via the Internet. The user 1 can browse only information about the point ID associated with him/her on the web page.

Figures 2, 3:
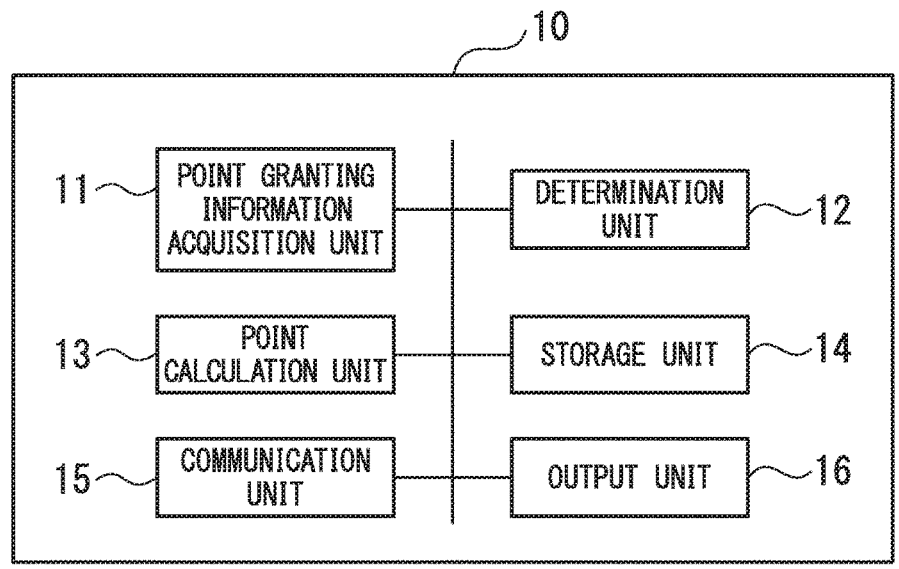
FIG. 2 is a block diagram showing an example of a point calculation device in the first embodiment according to the present invention.
FIG. 3 is a first diagram showing an example of a table used in point calculation in the first embodiment according to the present invention.

FIG. 2 is a block diagram showing an example of a point calculation device according to the first embodiment of the present invention.

As shown in FIG. 2, the point calculation device 10 includes a point granting information acquisition unit 11, a determination unit 12, a point calculation unit 13, a storage unit 14, a communication unit 15, and an output unit 16.

The point granting information acquisition unit 11 acquires a point granting start time and a point granting end time of use points relating to a vehicle. For example, the point granting information acquisition unit 11 acquires the reading time of the point ID and the point ID recorded on the card 3 transmitted from the transmission device 20. Alternatively, the point granting information acquisition unit 11 acquires the departure time and arrival time of the boat 2 from the terminal device 21.

The determination unit 12 performs a deter process of the information acquired from the point granting information acquisition unit 11. The determination process is, for example, a process of determining whether or not a point ID is stored in the storage unit of the point calculation device 10.

For each point ID acquired by the point granting information acquisition unit 11, the point calculation unit 13 calculates points according to a time difference between the point granting start time and the point granting end time.

The storage unit 14 stores various pieces of information such as the point granting time acquired by the point granting information acquisition unit 11 and a table for calculating points to be granted.

The communication unit 15 exchanges information with other devices.

The output unit 6 outputs the points calculated by the point calculation unit 13 to an inboard monitor or the like.

FIG. 3 is a first diagram showing an example of a table used for point calculation in the first embodiment according to the present invention.

FIG. 3 shows an example of an embarkation/disembarkation record table of the user 1 stored in the storage unit 14. As shown in FIG. 3, an embarkation/disembarkation record table 101 stores items such as "point ID," "embarkation port," "embarkation time," "disembarkation port," "disembarkation time," "passenger room grade," and "operation ID." In the "point ID," the point ID of the user 1 is stored. In the "embarkation port,"n a port where the user 1 embarked on the boat is stored. In the "embarkation time," an embarkation time (a point granting start time) of the user 1 is stored. In the "disembarkation port," a port where the user 1 disembarked from the boat is stored. In the "disembarkation time," a disembarkation time (a point granting end time) of the user 1 is stored. In the "passenger room grade," a grade of passenger room used by the user 1 is stored. For example, the passenger room grade includes "second grade," "special second grade," "first grade," and "special grade." In the "operation ID," an identification number of a boat used by the user 1 is stored.

FIG. 4 is a second diagram showing an example of a table used for point calculation in the first embodiment according to the present invention.

FIG. 4 is an example of a navigation record table of the boat 2 stored in storage unit 14. As shown in FIG. 4, a navigation record table 102 stores items of "operation ID," "branch number," "vessel name," "departure port," "scheduled port departure time," "port departure time," "arrival port," "scheduled port arrival time," and "port arrival time." In the "operation ID," an identification number of a boat is stored. In the "branch number," when a plurality of sections are included in a navigation route of a certain boat 2, numbers allocated to the sections are stored. For example, when a boat with operation ID=001 navigates from port A to port D and stops at ports B and C in the middle, branch number=01 is allocated to a section from port A to port B, branch number=02 is allocated to a section from port B to port C, and branch number=03 is allocated to a section from port C to port D. In the "vessel name," a type or name of the boat is stored. A name of a port from which the boat departs in each section is stored in the "departure port" and a name of a port at which the boat arrives in each section is stored in the "arrival port." A port departure time written on a timetable is stored in the "scheduled port departure time," and a port arrival time written on the timetable is stored in the "scheduled port arrival port time." An actual port departure time is stored in the "port departure time," and an actual port arrival time is stored in the "port arrival time."

FIG. 5 is a third diagram showing an example of a table used for point calculation in the first embodiment according to the present invention.

FIG. 5 is an example of a point conversion table defining a point calculation method stored in the storage unit 14. As shown in FIG. 5, the point conversion table 103 has items of "condition" and "granted points." In the "condition," a situation in which points are granted is stored. In the "granted points," points to be granted are stored when the "condition" is satisfied. Data in a first row of the point conversion table 103 assumes that 100 points, which are points set in accordance with the embarkation time of the section from port A to port B, are granted at a time of embarking on a boat from port A to port B. Hereinafter, the granted points predetermined for each embarkation section are referred to as basic points. Also, for example, data of a sixth row defines that 1 point is granted per minute of embarkation time. Point granting based on provision of the point conversion table 103 will be described below with an example.

Figures 6, 7:
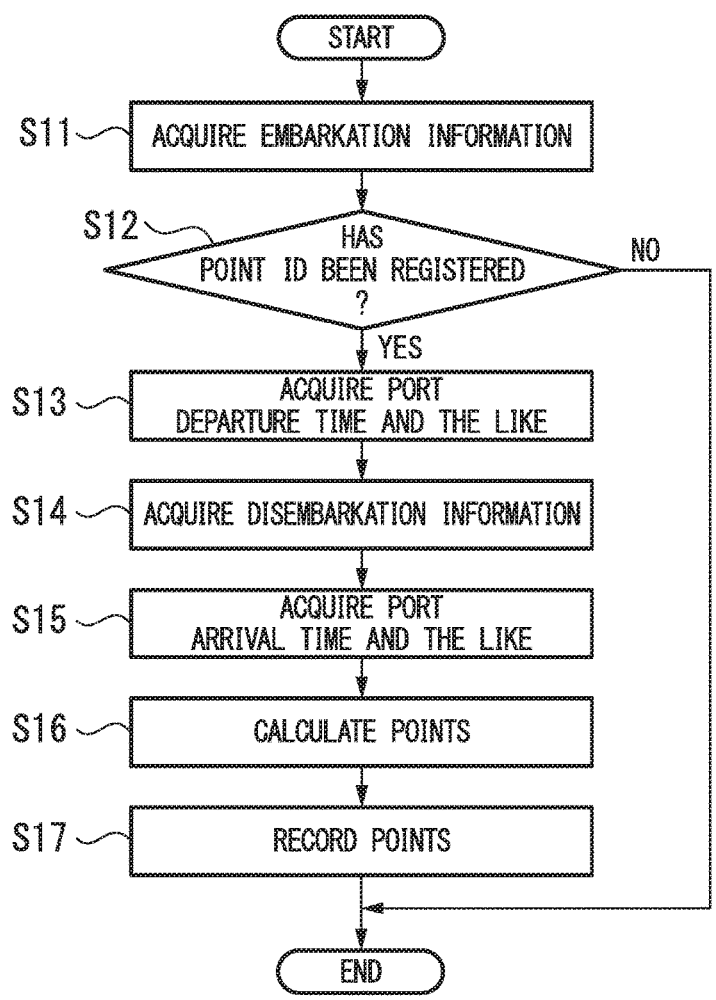
FIG. 6 is a fourth diagram showing an example of a table used in point calculation in the first embodiment according to the present invention.
FIG. 7 is an example of a flowchart of a point calculation method in the first embodiment according to the present invention.

FIG. 6 is a fourth diagram showing an example of a table used for point calculation in the first embodiment according to the present invention.

FIG. 6 is an example of a point management table for storing points accumulated by the user 1 for each user 1 stored in the storage unit 14. As shown in FIG. 6, a point management table 104 has items of "point ID," "name," "contact information," "accumulated number of points," "validity period," and "card grade." In the "point ID," the point ID of the user 1 is stored. A name of the user 1 is stored in the "name," and an address or a telephone number, an e-mail address, a date of birth, or the like of the user 1 are stored in the "contact information." Points accumulated by the user 1 are stored in the "accumulated number of points," and a validity period of the points is stored in the "validity period." In the "card grade," a grade of the card 3 possessed by the user 1 is stored.

The point calculation unit 13 calculates points for each point ID according to the provision of point granting stored in the point conversion table 103 shown in FIG. 5 and adds the calculated points to the accumulated points of the point ID stored in the point management table 104. The user 1 can obtain a right to use a higher-grade passenger room or embark on a boat for free in exchange for accumulated points.

Also, the user 1 registers his or her personal information when the user 1 uses the boat 2 for the first time. At this time, a management system (not shown) for managing reservation information and the like allocates a point ID to the user 1 according to a predetermined method and creates data of the user 1 in the point management table 104.

FIG. 7 is an example of a flowchart of a point calculation method according to the first embodiment of the present invention.

The point calculation method when the user 1 uses the boat 2 will be described with reference to FIG. 7.

First, when the user 1 embarks on the boat 2, he/she holds the card 3 over a reader of a transmission device 20A provided at an embarkation port. Then, the transmission device 20A acquires information such as a point ID from the card 3, and transmits information such as the point ID, a reading time (an embarkation time), the embarkation port, an operation ID, and a grade of a passenger room purchased by the user 1 to the point calculation device 10. Also, information of the embarkation port and the operation ID are pre-recorded on the transmission device 20A. Also, the embarkation time is not necessarily an actual embarkation time. For example, the embarkation time may be an embarkation receipt time.

In the point calculation device 10, the point granting information acquisition unit 11 acquires the point ID of the user 1, the operation ID, the embarkation time, and the information of the embarkation port (step S11), and outputs them to the determination unit 12. Next, the determination unit 12 determines whether or not data of the acquired point ID is registered in the point management table 104 shown in FIG. 6 (step S12). When the point ID is not registered in the point management table 104 (step S12; No), an error message is displayed on a display device connected to the transmission device 20A, and the present processing flow ends. When the point ID is registered in the point management table 104 (step S12; Yes), the point granting information acquisition unit 11 writes and stores the acquired point ID, operation ID, embarkation time, embarkation port, and passenger room grade in the embarkation/disembarkation record table 101 of the storage unit 14 shown in FIG. 3. Also, in the determination of step S12, reservation information of the user may be compared with the acquired operation ID or embarkation port and a determination of whether or not the user 1 embarks on the boat according to the reservation information may be made.

Next, the point granting information acquisition unit 11 acquires an operation ID, a branch number, a vessel type, a departure port, a scheduled port departure time, and a port departure time of the boat 2 transmitted from a terminal device 21A of the embarkation port (step S13). The operation ID, the branch number, the vessel type, the departure port, the scheduled port departure time, and the port departure time are values input to the terminal device 21A by an employee of the embarkation port. The point granting information acquisition unit 11 records the acquired operation ID, branch number, vessel type, departure port, scheduled departure time, and port departure time in the navigation record table 102 shown in FIG. 4.

At a subsequent disembarkation port, the user 1 holds the card 3 over a reader of a transmission device 20B provided at the disembarkation port. Then, the transmission device 20B acquires the point ID from the card 3 and transmits the point ID, a reading time (a disembarkation time), the disembarkation port, and the operation ID to the point calculation device 10. Information of the disembarkation port and the operation ID are pre-recorded on the transmission device 20B. In the point calculation device 10, the point granting information acquisition unit 11 acquires the point ID, the disembarkation time, the information of the disembarkation port, and the operation ID (step S14). The point granting information acquisition unit 11 retrieves the embarkation/disembarkation record table 101 using the acquired point ID and operation ID, specifies a record indicating an embarkation/disembarkation record of the disembarkation user 1, and then updates the items of "disembarkation port" and "disembarkation time" of the record with the acquired information.

Next, the point granting information acquisition unit 11 acquires the operation ID, the branch number, the vessel type, an arrival port, a scheduled port arrival, and a port arrival time of the boat 2 transmitted from a terminal device 21B of the disembarkation port (step S15). The operation ID, the branch number, the vessel type, arrival port, the scheduled port arrival time, and the port arrival time are values input to the terminal device 21B by the employee at the arrival port. The point granting information acquisition unit 11 retrieves the navigation record table 102 using the acquired operation ID and branch number, specifies a record indicating a navigation record of the boat on which the user 1 embarked, and writes the acquired information of the arrival port, the scheduled port arrival time and the port arrival time in the items of "arrival port," "scheduled port arrival time," and "port arrival time" of the record.

Next, the point granting information acquisition unit 11 outputs the point ID and the operation ID to the point calculation unit 13 and instructs the point calculation unit 13 to calculate points with respect to the point ID of the disembarked user 1. The point calculation unit 13 calculates points with respect to the point ID (step S16). The present embodiment is characterized in that points are calculated according to a point granting time period for the user 1 who is embarked on the boat 2. Hereinafter, various point calculation methods of the present embodiment will be described.

[Point Calculation Based on Embarkation Time Period]

In the point calculation based on an embarkation time period, the point calculation unit 13 calculates points (first use points) according to an embarkation time period of the user 1. According to a point ID and an operation ID, the point calculation unit 13 reads an embarkation time and a disembarkation time from the embarkation/disembarkation record table 101 and subtracts the embarkation time from the disembarkation time. Then, points to be granted to the user 1 are calculated by multiplying a value obtained through the subtraction by the number of points granted per unit time. The point calculation unit 13 reads the number of points granted per unit time from the record of the point conversion table 103 that has the "condition" of "embarkation time period." In the example of FIG. 5, one point per minute is granted.

When points are calculated in this manner, more points are granted to the user 1 who embarks on the boat as quickly as possible and disembarks from the boat as slowly as possible. Generally, passengers of a ferry boat normally embark on the boat just before a departure time thereof, and this may cause delays in departure. Also, at a time of disembarking from the boat, there are many customers who intend to disembark from the boat as soon as possible, and this causes crowdedness. By introducing a point calculation method and a point granting method based on this embarkation time period, it is possible to solve these problems and expect an effect of promoting smooth embarkation and disembarkation. Moreover, dissatisfaction of users who cannot disembark from the boat easily due to crowdedness can be relieved.

It is also conceivable that the read operation is not performed with particular regard to the disembarkation time. In such a case, a disembarkation time period may be calculated using a fixed value such as a scheduled arrival time as the disembarkation time.

[Point Calculation Based on Time Period From Departure to Arrival]

In the point calculation based on a time period from departure to arrival, the point calculation unit 13 calculates points (first use points) according to a time period from a departure of the boat 2 to an arrival of the boat 2. According to a point ID and an operation ID, the point calculation unit 13 specifies an embarkation port and a disembarkation port of the user 1 embarking on the boat from the embarkation/disembarkation record table 101. Next, the point calculation unit 13 retrieves the navigation record table 102 from information of the operation ID, the embarkation port, and the disembarkation port and specifies navigation data of a section in which the user 1 embarked on the boat. The point calculation unit 13 reads a port departure time and a port arrival time from the specified navigation data and subtracts the port departure time from the port arrival time. The point calculation unit 13 calculates points to be granted to the user 1 by multiplying a value obtained through the subtraction by the number of points granted per unit time in navigation read from the point conversion table 103. In the example of FIG. 5, the number of points granted per unit time is one per minute in a record having the "condition" of "navigation time period."

In point calculation from the departure port to the arrival port, the same points are granted to the user 1 embarking on the boat in the same section so that the user does not feel inequality. Also, because points are granted according to a navigation time if the navigation is time-consuming, it is possible to alleviate dissatisfaction of the user even when a time period from a departure port to an arrival port is increased.

Also, for example, points are normally calculated according to a time period from port departure to port arrival and an operation form such as an introduction of the point calculation based on the above-described embarkation time period is considered in a place where a delay in port departure due to crowdedness is large, on a day when crowdedness is expected due to an event or the like, or the like.

[Point Calculation Based on Basic Points]

In the point calculation based on basic points, the point calculation unit 13 calculates points using points preset according to a navigation time period of each section according to a time period from a scheduled departure time of the boat 2 to a scheduled arrival time (first use points). According to a point ID and an operation ID, the point calculation unit 13 specifies an embarkation port and a disembarkation port of a service in which the user 1 has embarked on the boat from the embarkation/disembarkation record table 101. Next, the point calculation unit 13 retrieves the navigation record table 102 from information of the operation ID, the embarkation port, and the disembarkation port, and specifies navigation data of a section in which the user 1 embarked on the boat. For example, if the user 1 is assumed to embark on the boat from port A to port D in the service with an operation ID=001, records of first to third rows of the navigation record table 102 are specific targets. Next, the point calculation unit 13 reads the departure port and the arrival port from the specified navigation data, refers to the point conversion table 103, and reads granted points from a record having the "condition" of "departure port to arrival port." For example, in the above-described example, a value of 100 points granted to a section from "port A to port B" is read, a value of 120 points granted to a section from "port B to port C" is read, and a value of 80 points granted to the section from "port C to port D" is read. Next, the point calculation unit 13 sums all the read points and calculates points corresponding to the sections (ports A to D) in which the user 1 embarked on the boat.

In the point conversion table 103, points corresponding to a time period required for the navigation of each section (a time period from the scheduled departure time to the scheduled arrival time) are set. For example, even when a distance between port A and port B and a distance between port B and port C are the same, a large number of points is set between port A and the port B if more time is required for the navigation between port A and the port B according to the conditions of a sea area such as wind and waves. Also, even between the same ports A and B, a different number of points is set if a navigation time period is different due to a tidal current or the like between navigation from port A to port B and navigation from port B to port A. Also, even for the same navigation from port A to port B, points are set due to an influence of a tidal current or the like according to a navigation time period when the navigation time period changes according to a time zone. For example, fourth and fifth rows of FIG. 5 are examples thereof.

[Point Calculation in Consideration of Embarkation Time Period of User in Basic Points]

In the point calculation in which an embarkation time period of a user is taken into consideration in basic points, the point calculation unit 13 calculates points by adding points according to a time period obtained by summing a time period until port departure after the user embarks on a boat and a time period until the user disembarks from the boat after port arrival (second use points) to basic points determined for each section. A method of obtaining basic points based on a section in which the user 1 embarked on the boat is as described above. A method of calculating a time period until port departure after the user embarks on the boat and a time period until the user disembarks from the boat after port arrival is as follows. First, according to an operation ID and a point ID, the point calculation unit 13 reads an embarkation port, an embarkation time, a disembarkation port, and a disembarkation time of a service in which the user 1 has embarked on the boat from the embarkation/disembarkation record table 101. Next, the point calculation unit 13 retrieves the navigation record table 102 from information of the operation ID, the embarkation port, and the disembarkation port, specifies a record of navigation data of a section in which the user 1 embarked on the boat, and reads a port departure time and a port arrival time from the record. Next, the point calculation unit 13 subtracts the embarkation time from the read port departure time to calculate a time period until port departure after the user embarks on the boat. Also, the point calculation unit 13 subtracts the port arrival time from the read disembarkation time to calculate a time period until the user disembarks from the boat after port arrival.

Next, the point calculation unit 13 refers to the point conversion table 103, reads granted points per unit time from a record having the "condition" of "embarkation time," and multiplies a sum of the time period until port departure after the user embarks on the boat and the time period until the user disembarks from the boat after port arrival by the read number of granted points.

Finally, the point calculation unit 13 adds points according to a sum of the time period from embarkation to port departure and the time period from port arrival to disembarkation to the basic points according to an embarkation section.

The number of basic points used in the "point calculation in consideration of embarkation time of user in basic points" may be a value determined according to a distance of a section as well as a time period required to navigate in the section (a time period from the scheduled departure time to the scheduled arrival time) or may be a fixed value uniformly granted to every section (e.g., 100 points may be uniformly granted to every section of a section from port A to port B, a section from port B to port C, and a section from port C to port D)

According to this method, by prompting the user embark on the boat as soon as possible and disembark from the boat as slowly as possible, crowdedness due to a concentration of users or a navigation delay due to the crowdedness can be expected to be alleviated. It is also conceivable that the read operation is not performed with particular regard to the disembarkation time. In such a case, the time period until the user disembarks from the boat after port arrival may be calculated using a fixed value such as a scheduled arrival time as the disembarkation time.

[Point Calculation in Consideration of Arrival Delay]

In the point calculation in consideration of an arrival delay, the point calculation unit 13 calculates points (second use points) according to how much an actual arrival time at a port is delayed from a scheduled port arrival time written in a timetable.

According to an operation ID and a point ID, the point calculation unit 13 specifies an embarkation port and a disembarkation port of a service in which the user 1 has embarked on the boat from the embarkation/disembarkation record table 101. Next, the point calculation unit 13 retrieves the navigation record table 102 from information of the operation ID, the embarkation port, and the disembarkation port, specifies a record of navigation data of the section in which the user 1 embarked on the boat, and reads the scheduled port arrival time and a port arrival time of the specified navigation data. The point calculation unit 13 subtracts the scheduled port arrival time from the read port arrival time. If a value obtained through the subtraction is a positive value, the user 1 arrives at the disembarkation port after a delay in service. In that case, the point calculation unit 13 calculates points to be granted by multiplying the calculated arrival delay time period by the number of points per unit time for an arrival delay. The point calculation unit 13 reads granted points for the arrival delay per unit time from a record of the point conversion table 103 that has the "condition" of "arrival delay." In the example of FIG. 5, 10 points per minute are given. Thereby, dissatisfaction of the user can be reduced by converting the arrival delay of the boat into points. Points due to the arrival delay may not be granted if the calculated arrival delay time is within a predetermined allowable range (e.g., 1 minute). This point calculation in consideration of an arrival delay can be used in combination with any one of the above-described "point calculation based on embarkation time," "point calculation based on time period from port departure to port arrival," "point calculation based on basic points," and "point calculation in consideration of embarkation time period of user in basic points."

Also, in contrast, points to be granted to the user 1 may be reduced at a time of early arrival at a port.

[Point Calculation in Consideration of Departure Delay]

In the point calculation in consideration of a departure delay, the point calculation unit 13 calculates points (second use points) according to how much an actual port departure time is delayed from a scheduled port departure time written in a timetable.

According to a point ID and an operation ID, the point calculation unit 13 specifies an embarkation port and a disembarkation port of the user 1 embarking on a boat from the embarkation/disembarkation record table 101. Next, the point calculation unit 13 retrieves the navigation record table 102 from information of the operation ID, the embarkation port, and the disembarkation port, specifies navigation data of a section in which the user 1 embarked on the boat, and reads a scheduled port departure time and a port departure time of the specified navigation data. The point calculation unit 13 subtracts the scheduled port departure time from a port departure time. If a value obtained through the subtraction is a positive value, the user 1 departs from the embarkation port after a delay in service. In this case, the point calculation unit 13 calculates granted points by multiplying the calculated departure delay time period by the number of points per unit time for a departure delay. The point calculation unit 13 reads the points per unit time for a departure delay from a record of the point conversion table 103 that has the "condition" of "departure delay." In the example of FIG. 5, 5 points per minute are granted. If the departure of the boat 2 is delayed, the user will be uneasy as to whether he/she can arrive on time. By converting the departure delay of the boat into points, dissatisfaction of the user can be reduced. Points due to the departure delay may not be granted if the calculated departure delay time is within a predetermined allowable range (e.g., 1 minute). This point calculation in consideration of a departure delay can be used in combination with any one of the above-described point calculation methods as in "point calculation in consideration of departure delay."

"Point Calculation Based on Embarkation Time Period Within Predetermined Period"

In the point calculation based on an embarkation time period within a predetermined period, the point calculation unit 13 calculates points according to, for example, an embarkation time period during one month. This point calculation method is used for the purpose of additionally granting points to the user 1 with a high use frequency.

Point calculations according to a time period until the user 1 disembarks from the boat after embarkation, a time period from actual port departure of the boat 2 to port arrival, or a time period from a scheduled departure time to a scheduled arrival time as the point granting time period have been described above, but a method of calculating an embarkation time period at a time of each use within a predetermined period may be any one thereof. Here, a case in which a time period until the user 1 disembarks from the boat after embarkation is used will be described as an example. First, for each point ID, the point calculation unit 13 reads embarkation/disembarkation record data in the predetermined period from the embarkation/disembarkation record table 101. Then, the point calculation unit 13 calculates a total value of an embarkation time period during the determined period by summing values obtained by subtracting the embarkation time from the disembarkation time in each piece of embarkation/disembarkation record data. Next, the point calculation unit 13 refers to the point conversion table 103 and reads granted points from a record having the "condition" of "embarkation for X hours or more" according to the total value (≥X) of the embarkation time period. The point calculation unit 13 determines the read value as granted points.

In the point conversion table 103, for example, if a round trip is made three times or more a week in a certain section, an embarkation time period reachable in one month is set. Then, a passenger using a regular boat service of the section on a daily basis is encouraged to continuously use the boat 2 because points are added according to use.

Also, in many cases, a passenger who uses a regular boat service on a daily basis uses only a second-grade room (the lowest-grade passenger room). According to this point calculation method, users with high use frequencies can be expected to be induced to use high-grade passenger rooms by allowing such users to have opportunities to experience the higher grade passenger rooms using accumulated points.

"Point Calculation Based on Ticketing Time Period and Embarkation Time Period"

In the point calculation based on a ticketing time period and an embarkation time period, the point calculation unit 13 further adds a time period from ticketing to embarkation or a time period from ticketing to departure to a time period of a point calculation target in addition to the embarkation time period. For example, when the transmission device 20A is installed near a ticket vending machine and the user 1 holds the card 3 over it during ticket issuance, information of a ticket issuance transmitted to the point calculation device 10. In the point calculation device 10, the point granting information acquisition unit 11 is configured to write the ticket issuance time to an item of "embarkation time" of the embarkation/disembarkation record table 101. Then, the point calculation unit 13 calculates points according to a difference between "embarkation time" for which the ticket issuance time is recorded and "disembarkation time." A fixed value such as a scheduled arrival time may be used as the disembarkation time.

Ticket issuing machines and ticket sale places are often crowded when a departure time approaches. According to this point calculation method, it is possible to expect relaxation of crowdedness of the ticket sale places when the number of passengers trying to receive a ticket as soon as possible increases. By introducing the point calculation method into a port or the like where crowdedness of the ticket sale places becomes problematic due to a small number of ticket issuing machines or the like, the point calculation method can be used to prevent departure delay due to crowdedness.

The following is not a matter concerning the embarkation time period of the user 1, but the satisfaction of the user can be increased in combination with the point granting according to the above-described embarkation time period.

"Point Calculation Based on Level of Crowdedness"

In the point calculation based on a level of crowdedness, the point calculation unit 13 further sums points (second use points) according to a level of crowdedness of the boat 2 in addition to an embarkation time period. For example, at each port, an employee counts the number of passengers who embark on and disembark from the boat and transmits the counted number from the terminal device 21 to a management system via a network. In the management system, the number of passengers is recorded for each boat and section. The point calculation unit 13 acquires the number of passengers in the section in which the user 1 serving as a target of point calculation has embarked on the boat from the management system, and calculates, for example, a percentage of the maximum number of passengers. When the number of passengers reaches 90% of the maximum number of passengers on the boat 2, granted points are acquired from a record having the "condition" of "embarkation ratio of 90% or more" from the point conversion table 103, and points are granted to the user 1 embarking on the boat in the section in addition to points according to the embarkation time period.

Thereby, it is possible to alleviate discomfort and the like due to crowdedness of the boat 2 or dissatisfaction due to impossibility of use because of full occupancy in spite of wanting to use a high grade passenger room.

Alternatively, the use of the user may be encouraged by assigning points to a section with a low level of crowdedness.

"Point Calculation Based on Passenger Room Grade"

In the point calculation based on passenger room grade, the point calculation unit 13 further adds points based on a grade of a passenger room used by the user 1 (second use points) to points based on an embarkation time period.

The point calculation unit 13 reads information of the passenger room grade used by the user 1 according to a point ID from the embarkation/disembarkation record table 101. The point calculation unit 13 acquires points to be granted for the read passenger room grade from the point conversion table 103. For example, if the grade of the passenger room used by the user 1 is "first grade," 10 points are acquired from data in which the condition is "first grade" in the example of FIG. 5. Then, the point calculation unit 13 adds 10 points to the points based on the embarkation time period to calculate points to be granted to the user.

For example, when grades are divided into "second grade," "first grade," and "special grade" in ascending order of grade, it is possible to grant points to a user of a room of the first grade or higher without granting points to a user of a second-grade room when points to be granted are set for "first grade," and "special grade" in the point conversion table 103. By performing setting as described above, it is possible to favorably treat users who use rooms of the first grade or higher and induce the users to use rooms with a high grade.

Also, for example, even when a user who normally uses an inexpensive second-grade room wishes to use the first-grade room in a situation where the boat is crowded, it becomes easy to use the first-grade room if points are added thereto.

Also, the number of points to be granted may differ according to a type of vessel on which the user embarks in addition to being differentiated based on a passenger room grade.

"Point Calculation Based on Number of Users"

In the point calculation based on the number of users, the point calculation unit 13 further adds points based on the number of users (second use points) to points based on an embarkation time period for a passenger embarking on a boat in a family or a passenger embarking on the boat in a group.

Information of the number of users is included in reservation information input from the user at a time of reservation and stored in a management system. Upon calculation of points, the point calculation unit 13 acquires information of the number of users with reference to this reservation information. Then, the pain calculation unit 13 acquires points corresponding to the number of users with reference to the point conversion table 103 and adds the acquired points to the points based on the embarkation time period. In the example of FIG. 5, in the case of use by four or more users, five points are added to a point ID of each of the four or more passengers who embark on the boat. Thereby, it is possible to encourage embarkation with more friends and the like to promoting the use of the boat.

"Point Calculation at Time of Navigation Cancellation, Port Skip, or Return"

In the point calculation at a time of navigation cancellation, the point calculation unit 13 calculates points to be granted to a user who has come to a port as if he/she is actually going to embark on a boat when it is no longer possible to operate the boat 2 due to a sudden weather change.

In such a case, information indicating the navigation cancellation together with a point ID or the like is set to be transmitted to the computer constituting the transmission device 20A. In this state, when the user 1 holds the card 3 over the transmission device 20A, the transmission device 20A transmits the point ID, an operation ID and information indicating the navigation cancellation to the point calculation device 10. In the point calculation device 10, the point granting information acquisition unit 11 acquires the information and outputs the information to the point calculation unit 13. The point calculation unit 13 reads granted points from data of the point conversion table 103 that has the "condition" of navigation cancellation and determines a value thereof as points to be granted to the user 1. Also, if a port skip or return has been made during navigation, the transmission device 20B transmits information indicating that the port skip or return has been made to the point calculation device 10 together with the point ID or the like as in the case of the navigation cancellation. The point calculation unit 13 reads granted points from data of the point conversion table 103 that has the "condition" of "port skip" or "return" and determines a value thereof as the points to be granted to the user 1 (second use points). Also, the port skip is a case in which, although the boat normally stops at a port, the port is passed without going to that port due to bad weather or the like. In this case, points granted due to the port skip are, added to the points based on the embarkation time period for the user 1 scheduled to disembark from the boat at a skipped port. Also, points are granted due to the navigation cancellation for the user 1 scheduled to embark on the boat at the skipped port. Also, the return is a case in which the boat 2 is returned to a previous port due to bad weather or the like before the boat 2 normally reaches a port. Even in this case, points granted due to the return are added to the points based on the embarkation time period for the user 1 who could not arrive at the destination port due to the return. Also, points are granted due to the navigation cancellation for the user 1 scheduled to embark on the boat from a port that could not be reached.

Thereby, dissatisfaction of the user stuck by the navigation cancellation or the like can be alleviated.

"Point Calculation Based on Number of Embarkations"

In the point calculation based on the number of embarkations, the point calculation unit 13 calculates points (second use points) according to the number of embarkations.

The point calculation unit 13 acquires points to be granted according to the number of embarkations from the point conversion table 103. For example, in the example of FIG. 5, one point is acquired from data in which the condition is "number of embarkations." This point is granted for one embarkation. The point calculation unit 13 adds the read one point to points based on an embarkation time period and calculates points to be granted to the user.

Although FIG. 5 shows an example in which one point is granted for one embarkation, predetermined points (e.g., 10 points) may be granted every 10 embarkations. Also, when the accumulated number of embarkations reaches 100, points to be granted may be changed step by step according to the accumulated number of embarkations such as a case in which 15 points are granted every 10 embarkations thereafter or the like.

"Point Calculation Based on Card Grade"

In the point calculation based on a passenger room grade, the point calculation unit 13 sums points based on a grade of the card 3 used by the user 1 (second use points). Various grades of cards with differing services that can be enjoyed according to an annual fee or the like are prepared for the card 3, and the user 1 can obtain points according to the grade of the card 3 that he/she uses The point calculation unit 13 reads grade information of the card 3 used by the user 1 according to the point ID from the embarkation/disembarkation record table 101. The point calculation unit 13 acquires points to be granted for the read card grade from the point conversion table 103. For example, if the grade of the card 3 used by the user 1 is "$1^{st}$," five points are acquired from data in which the condition is "card grade ($1^{st}$)" in the example of FIG. 5. Then, the point calculation unit 13 adds 5 points to points based on an embarkation time period to calculate points to be granted to the user.

When points are calculated by these methods, the point calculation unit 13 records the points in the point management table 104 shown in FIG. 6 (step S17). Specifically, the point calculation unit 13 specifies a record of the point ID corresponding to the calculated points and reads the accumulated points. The point calculation unit 13 adds the points calculated in step S16 to the read accumulated points and updates a value of "accumulated number of points" of the record in the point management table 104.

According to the present embodiment, because a user can obtain points suitable for experience during embarkation by granting points according to a time period during which the user is actually embarked on the boat, the user can more satisfactorily use the boat and it is possible to promote the use of boats Also, according to the point calculation system of the present embodiment, it is possible to obtain information such as contact information of the user 1, an embarkation/disembarkation port, and a frequency of use of a boat. Information provision can be performed for each user 1 using this information. The information to be provided is, for example, information such as a bargain sale and events in a commercial facility near the embarkation port or the disembarkation port of the user 1, an operation state of transportation available from the disembarkation port, transfer information, or the like. By providing these pieces of information, the user 1 can more conveniently utilize the boat. The point calculation system will also collaborate with the commercial facility near the port to contribute to regional promotion so that an increase in the number of users of the boat can be expected.

Also, the boat 2 is provided with an inboard monitor that is connected to the point calculation device 10 via a network. On the inboard monitor, first use points and second use points output by the output unit 16 are distinguished and displayed in addition to a process of displaying a current traveling position of the boat 2, a scheduled arrival time, and the like.

Generally, the output unit 16 outputs "point calculation in consideration of arrival delay," "point calculation in consideration of departure delay," "point calculation based on level of crowdedness" "point calculation at the time of navigation cancellation, port skip, or return," or the like commonly related the first use points and the second use points of a plurality of users in each embarkation section. Also, a reading device of the card 3 connected to the point calculation device 10 by wireless communication or the like is provided, for example, near the inboard monitor, and the output unit 16 acquires the point ID read from the card 3 of the certain user 1 from the reading device via the communication unit 15. In that case, the output unit 16 may further display the number of points unique user calculated by the point calculation unit 13 (e.g., the number of points for the embarkation time period of the user among "points in consideration of embarkation time period of user in basic points," "points based on the number of users," and the like).

Second Embodiment

Hereinafter, a point calculation system according to the second embodiment of the present invention will be described with reference to FIG. 8.

Figure 8:
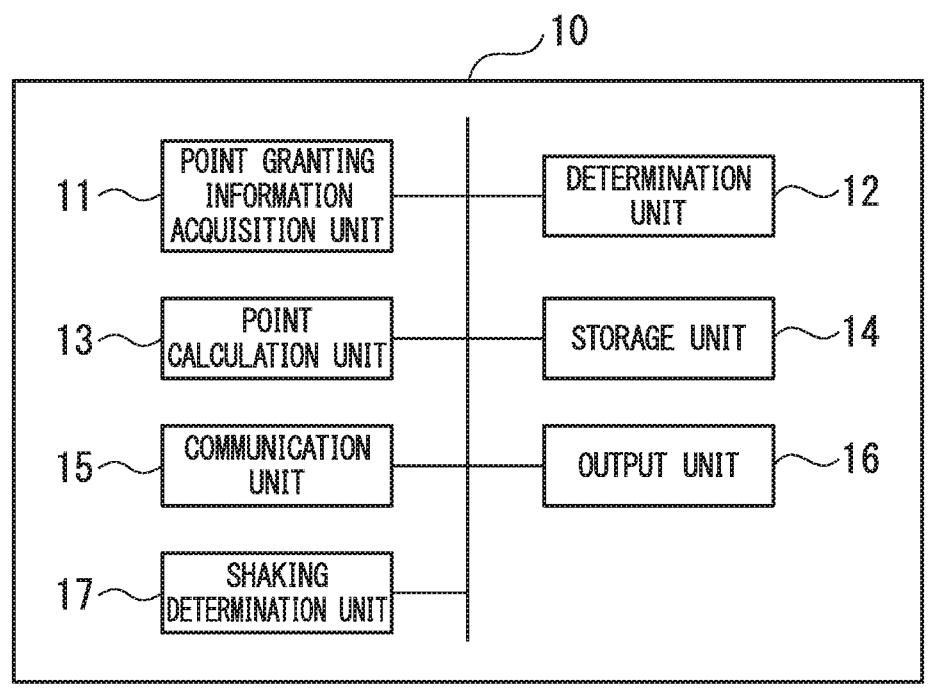
FIG. 8 is a block diagram showing an example of a point calculation device in a second embodiment according to the present invention.

FIG. 8 is a diagram showing an example of a point calculation device according to the second embodiment of the present invention.

As shown in FIG. 8, the point calculation device of the present embodiment includes a shaking determination unit 17.

The shaking determination unit 17 acquires detection information of a vibration sensor mounted on the boat 2 from the boat 2 and determines a shaking of the boat 2. The vibration sensor is, for example, a gyro sensor, an acceleration sensor, an inclinometer, or the like. The other components of the point calculation device are the same as those in the first embodiment.

A point calculation method in the present embodiment will be described. First, a communication device provided in the boat 2 transmits detection information of a vibration sensor to the point calculation device 10. In the point calculation device 10, the communication unit 15 acquires the detection information and writes the detection information to the storage unit 14. Next, the shaking determination unit 17 reads detection information in an embarkation section of a user from the storage unit 14. The read detection information is, for example, information in which an acceleration and angular velocity of a body of the boat are chronologically recorded. The shaking determination unit 17 integrates the read acceleration to calculate a magnitude (amplitude) of a shaking. Alternatively, the shaking determination unit 17 integrates the read angular velocity to calculate an angle at which the body of the boat is shaken. The shaking determination unit 17 compares the magnitude or angle of the calculated shaking with a predetermined threshold value, and determines that a point granting target is in a shaken state if a shaking of a predetermined magnitude or angle or more continues for a predetermined period. The shaking determination unit 17 calculates a total time period during which it is determined that the boat 2 is in the shaken state in the embarkation section of the user. The shaking determination unit 17 outputs the calculated total time period to the point calculation unit 13. In the point conversion table 103, points for a shaking per unit time (e.g., 1 minute) are defined and the point calculation 13 reads this information and calculates points for a time period of the shaking of the boat 2 in the embarkation section of the user 1 by multiplying the total time period acquired from the shaking determination unit 17 by the number of points.

Next, the point calculation unit 13 determines points to be finally granted by adding the calculated shake-based points to points calculated based on the embarkation time period and the like described in the first embodiment. According to the present embodiment, because the points according to the shaking of the boat body are granted in addition to the embarkation time period of the user, the user's dissatisfaction due to the shaking of the boat body is expected to be alleviated.

Also, in determining the shaking of the boat, it may be determined using the weather data of an ocean. Specifically, the shaking determination unit 17 acquires weather data such as waves, tide level, ocean current, ocean wind, etc. from the meteorological agency and calculates a time period during which the boat 2 is shaken according to the information. For example, in the storage unit 14, a correspondence table of the weather data and the time period during which the boat is shaken per unit time (e.g., 20 minutes per hour) calculated from weather data of a past time, an actually measured shaking value at the past time, and the like is stored. The shaking determination unit 17 reads a shaking time period per unit time from this table using the weather data while the user 1 is embarked on the boat and calculates a time period during a state in which the boat 2 is shaken by multiplying the embarkation time period of the user 1 by the read shaking time period. The point calculation unit 13 calculates points based on the shaking by multiplying the number of points for the shaking per unit time stored in the point conversion table 103 by a time period during which the boat 2 is in the shaken state calculated by the shaking determination unit 17.

Also, a process of processing in the above-described point calculation device 10 is stored in a computer-readable recording medium in the form of a program and the above-described processing is performed by the computer of the point calculation device 10 reading and executing the program. Here, the computer-readable recording medium may be a magnetic disk, a magneto-optical disc, a compact disc read-only memory (CD-ROM), a digital versatile disc-read only memory (DVD-ROM), a semiconductor memory, or the like. Also, the computer program may be distributed to a computer through a communication line, and the computer receiving the distributed program may execute the program.

Also, the above-described program may be a program for implementing some of the above-described functions. Further, the above-described program may be a program, i.e., a so-called differential file (differential program), capable of implementing the above-described function in combination with a program already recorded on the computer system.

Also, the point calculation device 10 may be configured to chide one computer or may be configured to include a plurality of computers connected to be communicable.

Components in the above-described embodiments can be appropriately replaced with well-known components without departing from the spirit or scope of the present invention. Also, the technical scope of the present invention is not limited to the above-described embodiments and various changes can be made thereto without departing from the spirit or scope of the present invention. For example, the point calculation method of the present invention can be applied to operation services of vehicles such as a passenger aircraft, a bus, and a railroad. The boat 2 is an example of a vehicle. An embarkation time and an embarkation receipt time are examples of a boarding time. A disembarkation time is an example of a deboarding time. The transmission device 20 is an example of a transmission means. Points are an example of use points. The number of embarkations is an example of the number of hoardings. A port for which disembarkation is impossible due to the port skip or return is an example of a scheduled deboarding place.

INDUSTRIAL APPLICABILITY

According to the above-described point calculation device, boat, point calculation method, and program, it is possible to grant points according to a time period during which a user is actually embarked on a boat. Also, it is possible to provide information such as advantageous information for each user based on embarkation records, contact information, and so on, for each user.

REFERENCE SIGNS LIST

1 User
2 Boat
3 Card
10 Point calculation device
11 Point granting information acquisition unit
12 Determination unit
13 Point calculation unit
14 Storage unit
15 Communication unit
16 Output unit
17 Shaking determination unit
20 Transmission device

What is claimed is:

1. A point calculation system, comprising:
a vehicle equipped with a vibration sensor;
a point calculation device constituted by a computer and comprising:
a storage unit configured to store a point conversion table in which first use points according to an embarkation time period of a user and second use points according to a time period until the vehicle departs after the user boards the vehicle and a time period until the user disembarks after the vehicle arrives at a port are recorded;
a point granting information acquisition unit configured to acquire a point granting start time and a point granting end time for use points relating to the vehicle and store the point granting start time and the point granting end time to the storage unit; and
a point calculation unit configured to calculate first use points for the user of the vehicle according to a time difference between the acquired point granting start time and the acquired point granting end time,
wherein the point granting start time is a boarding time of the user on the vehicle,
wherein the point granting end time is a deboarding time of the user from the vehicle,
wherein the point granting information acquisition unit is configured to acquire a departure time of the vehicle and an arrival time of the vehicle, and record the departure time of the vehicle and the arrival time of the vehicle to the storage unit, and
wherein the point calculation unit is configured to read the boarding time on the vehicle, the deboarding time from the vehicle, the departure time of the vehicle and the arrival time of the vehicle, and add second use points calculated according a time obtained by adding a difference between the deboarding time from the vehicle and an arrival time of the vehicle to a difference between the boarding time on the vehicle and a departure time of the vehicle to the first use points;
a card having an IC chip or a magnetic tape in which identification information is recorded;

a transmission device configured to read the identification information recorded in the card when the user boarding on the vehicle or deboarding from the vehicle holds the card over the transmission device, and transmit a reading time as the boarding time or the deboarding time along with the identification information to the point calculation device;

a terminal device configured to transmit the arrival time of the vehicle and the departure time of the vehicle which is input to the terminal device to the point calculation device; and a shaking determination unit configured to
acquire detection information of the vibration sensor mounted on the vehicle, the detection information comprises information in which an acceleration of the vehicle or an angular velocity of a body of the vehicle is chronologically recorded, determine a magnitude of a shaking of the vehicle or an angle at which the body of the vehicle is shaken according to the acceleration of the vehicle or the angular velocity of the body of the vehicle, in response to the calculated magnitude or angle being equal to or greater than a predetermined threshold for at least a predetermined time period, determine that the vehicle is in a shaken state, calculate a total time period during which the vehicle is in the shaken state while the user is on board the vehicle, and output the calculated total time period to the point calculation unit, wherein the point calculation unit further adds use points calculated according to the total time period during which the shaking determination unit determines that the vehicle is in the shaken state.

2. The point calculation system according to claim 1, wherein the point calculation unit is configured to add second use points calculated according a time obtained by adding the difference between the deboarding time from the vehicle and the arrival time of the vehicle along with a difference between an issuance time of a ticket necessary for the boarding on the vehicle and the boarding time on the vehicle to the difference between the boarding time on the vehicle and the departure time of the vehicle to the first use points.

3. The point calculation system according to claim 1, wherein the point calculation unit adds the calculated second use points to use points determined for a predetermined boarding section instead of the first use points calculated according to the time difference between the point granting start time and the point granting end time.

4. The point calculation system according to claim 1, wherein the point calculation unit calculates use points according to a sum of the time difference between the point granting start time and the point granting end time when the vehicle is used for a predetermined period.

5. The point calculation system according to claim 1, wherein the point calculation unit adds the second use points calculated according to at least one of a grade of a card in which identification information of the user is recorded to be used by the user to record boarding on the vehicle, a grade of a passenger room used by the user in the vehicle, the number of times that the user boards the vehicle, the number of users pre-registered as users on board with the user when he/she boards the vehicle, a level of crowdedness of the vehicle in a section in which the user boards the vehicle, and a case in which the user has not deboarded the vehicle at a scheduled deboarding place to the first use points.

6. The point calculation system according to claim 1, wherein the point calculation unit calculates points for a case in which the vehicle is not operated when the vehicle is not operated.

7. The point calculation system according to claim 1, further comprising:
an output unit configured to output the first use points calculated by the point calculation unit,
wherein, when the point calculation unit has calculated the second use points, the output unit outputs the second use points in addition to the first use points by distinguishing the second use points from the first use points.

8. The point calculation system according to claim 1, wherein the point calculation device, the transmission device, and the terminal device are connected through a network, and the card is held by the user.

9. The point calculation system according to claim 1, wherein
the transmission device comprises:
a first communication device provided at a departure location and configured to read the information recorded in the card possessed by the user boarding on the vehicle, and transmit the reading time of the information as the boarding time to the point calculation device; and
a second communication device provided at an arrival location and configured to read the information recorded in the card possessed by the user deboarding from the vehicle, and transmit the reading time of the information as the deboarding time to the point calculation device,
the terminal device comprises either (a) or (b)
(a) a first terminal device provided at the departure location and configured to receive the departure time of the vehicle and transmit the departure time which is input to the first terminal device to the point calculation device, and a second terminal device provided at the arrival location and configured to receive the arrival time of the vehicle and transmit the arrival time which is input to the second terminal device to the point calculation device,
(b) a third terminal device provided at a data center and configured to receive the departure time of the vehicle and the arrival time of the vehicle and transmit the departure time and the arrival time both of which are input to the third terminal device to the point calculation device, and
the point calculation system further comprises a monitor configured to distinguish and display the first use points and the second use points.

10. The point calculation system according to claim 1, wherein
the shaking determination unit is configured to integrate the acceleration to calculate the magnitude of the shaking of the vehicle.

11. The point calculation system according to claim 1, wherein
the shaking determination unit is configured to integrate the angular velocity to calculate the angle at which the body of the vehicle is shaken.

12. The point calculation system according to claim 1, wherein the vehicle is a boat.

13. The point calculation system according to claim 12, wherein the vibration sensor is a gyro sensor.

14. The point calculation system according to claim 12, wherein the vibration sensor is an acceleration sensor.

15. The point calculation system according to claim 12, wherein the vibration sensor is an inclinometer.

16. A point calculation system, comprising:
a vehicle equipped with a vibration sensor;
a point calculation device constituted by a computer and comprising:
a storage unit configured to store a point conversion table in which first use points according to an embarkation time period of a user and second use points according to a time period until the vehicle departs after the user boards the vehicle and a time period until the user disembarks after the vehicle arrives at a port are recorded;
a point granting information acquisition unit configured to acquire a point granting start time and a point granting end time for use points relating to the vehicle and store the point granting start time and the point granting end time to the storage unit; and
a point calculation unit configured to calculate first use points for the user of the vehicle according to a time difference between the acquired point granting start time and the acquired point granting end time,
wherein the point granting start time is a departure time of the vehicle,
wherein the point granting end time is an arrival time of the vehicle,
wherein the point granting information acquisition unit is configured to acquire the departure time of the vehicle and the arrival time of the vehicle, and record the departure time of the vehicle and the arrival time of the vehicle to the storage unit, and
wherein the point calculation unit is configured to read a boarding time on the vehicle, a deboarding time from the vehicle, the departure time of the vehicle and the arrival time of the vehicle, and add second use points calculated according a time obtained by adding a difference between the deboarding time from the vehicle and the arrival time of the vehicle to a difference between the boarding time on the vehicle and the departure time of the vehicle to the first use points;
a card having an IC chip or a magnetic tape in which identification information is recorded;
a transmission device configured to read the identification information recorded in the card when the user boarding on the vehicle or deboarding from the vehicle holds the card over the transmission device, and transmit a reading time as the boarding time or the deboarding time along with the identification information to the point calculation device;
a terminal device configured to transmit the arrival time of the vehicle and the departure time of the vehicle which is input to the terminal device to the point calculation device; and
a shaking determination unit configured to
acquire detection information of the vibration sensor mounted on the vehicle, the detection information comprises information in which an acceleration of the vehicle or an angular velocity of a body of the vehicle is chronologically recorded,
determine a magnitude of a shaking of the vehicle or an angle at which the body of the vehicle is shaken according to the acceleration of the vehicle or the angular velocity of the body of the vehicle,
in response to the calculated magnitude or angle being equal to or greater than a predetermined threshold for at least a predetermined time period, determine that the vehicle is in a shaken state,
calculate a total time period during which the vehicle is in the shaken state while the user is on board the vehicle, and
output the calculated total time period to the point calculation unit,
wherein the point calculation unit further adds use points calculated according to the total time period during which the shaking determination unit determines that the vehicle is in the shaken state.

17. A point calculation system, comprising:
a vehicle equipped with a vibration sensor;
a point calculation device constituted by a computer and comprising:
a storage unit configured to store a point conversion table in which first use points according to an embarkation time period of a user and second use points according to a time period until the vehicle departs after the user boards the vehicle and a time period until the user disembarks after the vehicle arrives at a port are recorded;
a point granting information acquisition unit configured to acquire a point granting start time and a point granting end time for use points relating to the vehicle and store the point granting start time and the point granting end time to the storage unit; and
a point calculation unit configured to calculate first use points for the user of the vehicle according to a time difference between the acquired point granting start time and the acquired point granting end time,
wherein the point granting start time is a scheduled departure time of the vehicle,
wherein the point granting end time is a scheduled arrival time of the vehicle,
wherein the point granting information acquisition unit is configured to acquire a departure time of the vehicle and an arrival time of the vehicle, and record the departure time of the vehicle and the arrival time of the vehicle to the storage unit, and
wherein the point calculation unit is configured to add second use points calculated according a time obtained by adding a difference between a deboarding time from the vehicle and an arrival time of the vehicle to a difference between a boarding time on the vehicle and a departure time of the vehicle to the first use points;
a card having an IC chip or a magnetic tape in which identification information is recorded;
a transmission device configured to read the identification information recorded in the card when the user boarding on the vehicle or deboarding from the vehicle holds the card over the transmission device, and transmit a reading time as the boarding time or the deboarding time along with the identification information to the point calculation device;
a terminal device configured to transmit the arrival time of the vehicle and the departure time of the vehicle which is input to the terminal device to the point calculation device; and
a shaking determination unit configured to
acquire detection information of the vibration sensor mounted on the vehicle, the detection information comprises information in which an acceleration of the vehicle or an angular velocity of a body of the vehicle is chronologically recorded, determine a magnitude of a shaking of the vehicle or an angle at which the body of the vehicle is shaken according to the acceleration of the vehicle or the angular velocity of the body of the vehicle, in response to the calculated magnitude or angle being equal to or greater than a predetermined threshold for at least a predetermined time period, determine that the vehicle is in a shaken state, calculate a total time period during which the vehicle is in the shaken state while the user is on board the vehicle, and output the calculated total time period to the point calculation unit, wherein the point calculation unit further adds use points calculated according to the total time period during which the shaking determination unit determines that the vehicle is in the shaken state.

18. A point calculation method, comprising:

providing a vehicle equipped with a vibration sensor;

acquiring, by a point calculation device, a boarding time of a user on the vehicle which is a point granting start time for use points relating to the vehicle and a deboarding time of the user from the vehicle which is a point granting end time for use points relating to the vehicle;

calculating, by the point calculation device, first use points for the user of the vehicle according to a time difference between the acquired point granting start time and the acquired point granting end time;

adding, by the point calculation device, second use points calculated according a time obtained by adding a difference between the deboarding time from the vehicle and an arrival time of the vehicle to a difference between the boarding time on the vehicle and a departure time of the vehicle to the first use points;

by a transmission device connected to the point calculation device, reading identification information recorded in a card which has an IC chip or a magnetic tape containing the identification information and which is held by the user boarding on the vehicle or deboarding from the vehicle, and transmitting a reading time as the boarding time or the deboarding time along with the identification information to the point calculation device;

by a terminal device, transmitting the arrival time of the vehicle and the departure time of the vehicle which is input to the terminal device to the point calculation device; and by a shaking determination unit, acquiring detection information of the vibration sensor mounted on the vehicle, the detection information comprises information in which an acceleration of the vehicle or an angular velocity of a body of the vehicle is chronologically recorded, determining a magnitude of a shaking of the vehicle or an angle at which the body of the vehicle is shaken according to the acceleration of the vehicle or the angular velocity of the body of the vehicle, in response to the calculated magnitude or angle being equal to or greater than a predetermined threshold for at least a predetermined time period, determining that the vehicle is in a shaken state, calculating a total time period during which the vehicle is in the shaken state while the user is on board the vehicle, and outputting the calculated total time period to the point calculation unit, wherein said calculating by the point calculation device further comprises adding use points calculated according to the total time period during which the shaking determination unit determines that the vehicle is in the shaken state.

* * * * *